(12) United States Patent
Nishio et al.

(10) Patent No.: US 12,425,528 B2
(45) Date of Patent: Sep. 23, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Taisuke Nishio, Kanagawa (JP); Shunsuke Chino, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 18/466,704

(22) Filed: Sep. 13, 2023

(65) Prior Publication Data

US 2024/0080425 A1 Mar. 7, 2024

Related U.S. Application Data

(63) Continuation of application No. PCT/JP2022/008271, filed on Feb. 28, 2022.

(30) Foreign Application Priority Data

Mar. 15, 2021 (JP) ................................ 2021-041214

(51) Int. Cl.
*H04N 1/60* (2006.01)
*H04N 23/11* (2023.01)
*H04N 23/88* (2023.01)

(52) U.S. Cl.
CPC ........... *H04N 1/6077* (2013.01); *H04N 23/11* (2023.01)

(58) Field of Classification Search
CPC ..... H04N 1/6077; H04N 1/6086; H04N 23/88
USPC ........................................................ 348/223.1
See application file for complete search history.

(56) References Cited

U.S. PATENT DOCUMENTS

| | | | |
|---|---|---|---|
| 2005/0088537 A1 | 4/2005 | Nakamura | |
| 2016/0007001 A1* | 1/2016 | Kuchiki | H04N 23/88 |
| | | | 348/223.1 |
| 2021/0044785 A1* | 2/2021 | Hsiao | H04N 25/131 |
| 2022/0182525 A1* | 6/2022 | Lv | G06T 7/90 |
| 2022/0385873 A1* | 12/2022 | Feng | H04N 23/71 |

FOREIGN PATENT DOCUMENTS

| | | | |
|---|---|---|---|
| EP | 2928183 A1 | 10/2015 | |
| JP | 2005130317 A | 5/2005 | |
| JP | 2012023606 A | 2/2012 | |
| JP | 2014007692 A | 1/2014 | |
| JP | 2014216897 A | 11/2014 | |
| JP | 2017017593 A | 1/2017 | |

* cited by examiner

*Primary Examiner* — Anthony J Daniels
(74) *Attorney, Agent, or Firm* — Canon U.S.A., Inc. IP Division

(57) ABSTRACT

An image processing apparatus includes a detection unit configured to detect an influence of infrared light on a color of an input image, a calculation unit configured to calculate a first white balance control value based on the input image, a determination unit configured to perform determination of whether the first white balance control value is effective, and a setting unit configured to set a predetermined white balance control value based on a result of the determination by the determination unit.

20 Claims, 14 Drawing Sheets

IMAGE PROCESSING APPARATUS, IMAGE PROCESSING METHOD, AND STORAGE MEDIUM

CROSS-REFERENCE TO RELATED APPLICATIONS

This application is a Continuation of International Patent Application No. PCT/JP2022/008271, filed Feb. 28, 2022, which claims the benefit of Japanese Patent Application No. 2021-041214, filed Mar. 15, 2021, both of which are hereby incorporated by reference herein in their entirety.

BACKGROUND OF THE INVENTION

Field of the Invention

The present invention relates to a technique for processing an image captured by an imaging apparatus.

Background Art

Some conventionally known imaging apparatuses perform white balance (hereinafter, "WB", where appropriate) control with infrared light captured by an imaging sensor and outputs a color image.

Colors of color images are designed through consideration of a state in which only visible light is captured, i.e., a state in which an infrared light cut-off filter (hereinafter, "IRCF") is inserted on an optical axis to prevent infrared light from being captured. On the other hand, some imaging apparatuses have a mode which improves imaging sensor sensitivity by removing an IRCF from the optical axis and capturing infrared light in a low-illuminance environment. As described above, however, since colors of imaging apparatuses are designed based on the understanding that infrared light is not to be captured, colors of a color image is deteriorated if infrared light is captured. Specifically, colors of the captured image are more reddish in comparison with a case in which infrared light is not captured. That is, color reproducibility of the imaging apparatus decreases.

In contrast, patent literature (PTL) 1 discusses a technique for switching a method for white balance control in accordance with the position of an IRCF. According to PTL 1, the switching is performed between white balance control that is performed to adjust an integral value ratio of red, green, and blue (RGB) components in an entire screen to a ratio stored in advance, and white balance control that is performed to adjust the integral value ratio to a ratio of 1:1:1, according to the position of the IRCF. This improves color reproducibility of an imaging apparatus.

With the heightening of imaging element sensitivity in recent years, even if exposure is reduced by an amount corresponding to an infrared light amount captured without an IRCF, visible light components are able to be obtained. Thus, color information on an object obtained without the IRCF is less likely to be lost. In other words, with the heightening of imaging element sensitivity, a captured image in which a visible light component and an infrared light component are mixed together is easily obtained.

CITATION LIST

Patent Literature

PTL 1: Japanese Patent Laid-Open No. 2005-130317

In the conventional art discussed in the above patent literature, however, when the infrared light cut-off filter (IRCF) is removed, and if colors of an object within an imaging range are biased, white balance may be affected.

As described above, with the heightening of imaging element sensitivity, a captured image in which a visible light component and an infrared light component are mixed together can be obtained when an IRCF is removed. However, according to the above described conventional art, appropriate white balance control is not able to be performed.

SUMMARY OF THE INVENTION

Aspects of the present disclosure provide for performing control to obtain appropriate white balance even when an IRCF is removed.

According to an aspect of the present invention, an image processing apparatus includes at least one processor; and a memory coupled to the at least one processor, the memory storing instructions that, when executed by the at least one processor, cause the at least one processor to detect an influence of infrared light on a color of an input image, calculate a first white balance control value based on the input image, perform determination of whether the first white balance control value is effective; and set a predetermined white balance control value based on a result of the determination, wherein, based on a result of the detection, a determination condition is determined, the determination condition being used for the determination of whether the first white balance control value is effective.

Further features of the present invention will become apparent from the following description of exemplary embodiments with reference to the attached drawings.

DESCRIPTION OF THE EMBODIMENTS

Exemplary embodiments of the present invention will be described below with reference to the drawings.

The following exemplary embodiments do not limit the present invention, and not all the combinations of the features described in the present exemplary embodiments are essential for a method for solving the issues in the present invention. The configurations of the exemplary embodiments can be appropriately modified or changed in accordance with the specifications of an apparatus to which the present invention is applied, or various conditions (the use conditions and the use environment). A configuration may be obtained by appropriately combining parts of the following exemplary embodiments. In the following exemplary embodiments, similar components are described by designating the same signs.

First Exemplary Embodiment

Figure 1:
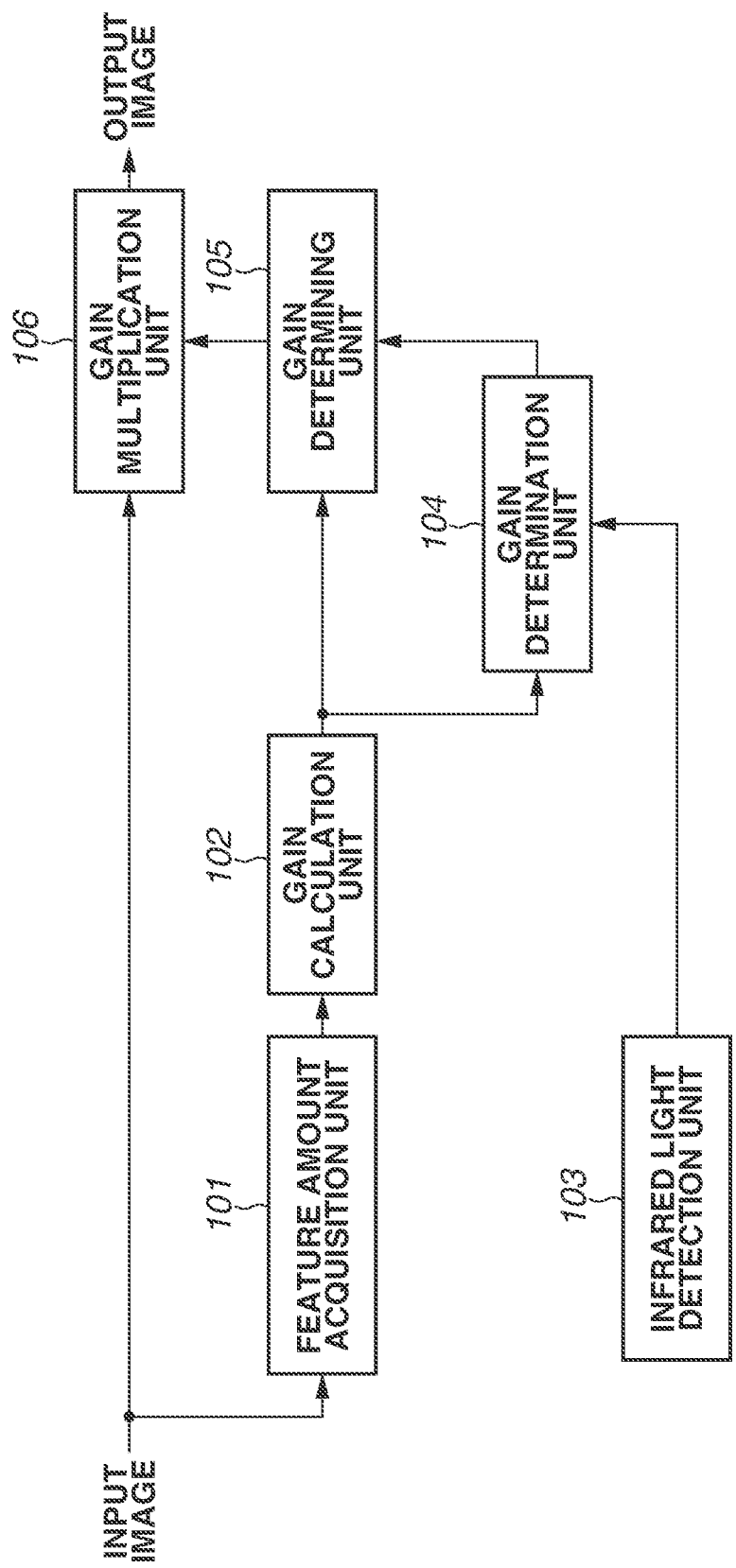
FIG. 1 is a diagram illustrating an example of a configuration of an image processing apparatus according to a first exemplary embodiment.

FIG. 1 is a block diagram illustrating a configuration example of an image processing apparatus according to a first exemplary embodiment.

With reference to FIG. 1, the image processing apparatus according to the first exemplary embodiment is described below. The image processing apparatus according to the present exemplary embodiment is an apparatus built into or connected to an imaging apparatus, such as a digital camera or a monitoring camera.

An input image is an image captured with an imaging unit including a lens and an imaging sensor (not illustrated). The input image is image data (or an image signal) on a plurality of pixels and contains information on a plurality of colors. For example, the plurality of colors is red (R), green (G), and blue (B) colors, and the image data corresponds to the amounts of light that has passed through color filters, disposed on the imaging sensor (not illustrated) and corresponding to the respective colors, and are converted into electric signals by the imaging sensor. The color filters transmit not only visible light corresponding to the red color, the green color, and the blue color, but also some infrared light (invisible light). Thus, an infrared light cut-off filter (IRCF) is disposed in general imaging apparatuses to remove infrared light components, whereby an image close to human visual perception is obtained. The imaging sensor includes an imaging element, such as a complementary metal-oxide-semiconductor (CMOS) sensor or a charge-coupled device (CCD).

An output image is an image obtained in such a manner that the white balance of the input image is appropriately corrected by multiplying a pixel value of the input image by a white balance gain as a final white balance control value calculated as described below. In the following description, white balance is referred to as "WB", where appropriate. Although the details will be described below, the image processing apparatus according to the present exemplary embodiment performs white balance control (WB control) based on determination of whether the input image is influenced by infrared light captured with the imaging sensor, whereby an output image in which the white balance of the input image is appropriately corrected is obtained.

A feature amount acquisition unit 101 acquires a feature amount of colors of the input image and outputs the feature amount to a gain calculation unit 102. More specifically, the feature amount acquisition unit 101 acquires color information determined based on image data contained in each rectangular region obtained by dividing the input image data into a plurality of rectangular regions, on a rectangular region by rectangular region basis. For example, the color information is a representative value of a color difference signal on each rectangular region. For example, the representative value is the average value or the mode.

According to the feature amount of the input image, the gain calculation unit 102 calculates a first white balance control value. For example, the gain calculation unit 102 acquires the color information on each region from the feature amount acquisition unit 101 and calculates a representative value of color information regarding the input image. Then, the gain calculation unit 102 calculates, as the first white balance control value, a white balance gain (hereinafter, "WB gain") with which a representative value of color information on the output image is to be adjusted to a predetermined target value. In the present exemplary embodiment, the WB gain that is used for white balance control is, for example, a red gain (hereinafter, "Red gain") for adjustment of redness of an image and a blue gain (hereinafter, "Blue gain") for adjustment of blueness of an image. The information on the WB gain calculated by the gain calculation unit 102 is sent to a gain determination unit 104 and a gain determining unit 105.

An infrared light detection unit 103 detects influence of infrared light on the colors of the input image. That is, the infrared light detection unit 103 performs detection of whether the colors of the input image are influenced by infrared light captured with the imaging sensor. Then, the infrared light detection unit 103 outputs a result of the detection to the gain determination unit 104. For example, in a case where an IRCF (not illustrated) is inserted on the optical axis of the lens of the imaging unit, the infrared light detection unit 103 detects that the colors of the input image are not influenced by infrared light. In a case where, on the other hand, the IRCF is not inserted on the optical axis of the lens of the imaging unit (is removed from the optical axis), the infrared light detection unit 103 detects that the colors of the input image are influenced by infrared light.

Based on the result of the detection acquired from the infrared light detection unit 103, the gain determination unit 104 determines a determination condition to perform determination of whether the WB gain (the first white balance control value) acquired from the gain calculation unit 102 is effective. Then, using the determination condition, the gain determination unit 104 performs determination of whether the WB gain (the first white balance control value) acquired from the gain calculation unit 102 is effective. Then, the gain determination unit 104 outputs a result of the determination to the gain determining unit 105. That is, based on a determination condition differed between a case where the colors of the input image are not influenced by infrared light and a case where the colors of the input image are influenced by infrared light, the gain determination unit 104 performs determination of whether the WB gain (the first white balance control value) is effective. Although the details will be described below, in the present exemplary embodiment, the gain determination unit 104 uses, as the determination condition, a predetermined region A1 and a predetermined region A2 for the WB gain. Then, for example, when the colors of the input image are not influenced by infrared light, and in a case where the WB gain acquired from the gain calculation unit 102 is within the predetermined region A1, the gain determination unit 104 determines that the WB gain is effective. When the colors of the input image are influenced by infrared light, and in a case where the WB gain acquired from the gain calculation unit 102 is within the predetermined region A2 different from the predetermined region A1, the gain determination unit 104 also determines that the WB gain is effective.

Although the details will be described below with reference to FIGS. 3 to 6. the predetermined region A1 is a region indicating an effective range of the WB gain of a case where the colors of the input image are not influenced by infrared light, and the predetermined region A2 is a region indicating an effective range of the WB gain of a case where the colors of the input image are influenced by infrared light. The predetermined region A1 is a region indicating the effective range of the WB gain and is for a case where only visible light is captured by the imaging sensor, i.e., a case where the IRCF is inserted on the optical axis to prevent infrared light form being captured. On the other hand, the position of the predetermined region A2 is designed in consideration of whether the colors of the input image are influenced by infrared light, and the sensitivity of the imaging sensor. More specifically, a ratio between infrared light and visible light captured by the imaging sensor without the IRCF is determined based on a ratio between infrared light and visible light in an imaging environment and a ratio between imaging sensor sensitivity to infrared light and imaging sensor sensitivity to visible light. Thus, in the present exemplary embodiment, the position of the predetermined region A2 is designed such that the position included in the predetermined region A2 is further away from the position of the predetermined region A1 with increase in the sensitivity of the imaging sensor. In other words, the predetermined region A2 is designed to factor in, with increase in the sensitivity of the imaging sensor, increase in the difference between the WB gain of a case where the colors of the input image are not influenced by infrared light and the WB gain of a case where the colors of the input image are influenced by infrared light.

The gain determining unit 105 determines a final white balance control value (a final WB gain) described below by which a gain multiplication unit 106 multiplies the input image. Although the details will be described below, based on the result of the determination of the gain determination unit 104 or the determination condition determined by the gain determination unit 104, the gain determining unit 105 determines the final WB gain. In the present exemplary embodiment, the final WB gain by which the gain multiplication unit 106 multiplies the input image is the WB gain (the first white balance control value) acquired from the gain calculation unit 102 or a second white balance control value which is a predetermined white balance control value. The gain determining unit 105 acquires the WB gain (the first white balance control value) from the gain calculation unit 102 and acquires, from the gain determination unit 104, the result of the determination of whether the WB gain is effective. Then, the gain determining unit 105 determines the final WB gain and outputs the final WB gain to the gain multiplication unit 106. More specifically, in a case where the result of the determination acquired from the gain determination unit 104 indicates that the WB gain is effective, the gain determining unit 105 outputs the first white balance control value calculated by the gain calculation unit 102 as the final WB gain to the gain multiplication unit 106. On the other hand, in a case where the result of the determination acquired from the gain determination unit 104 indicates that the WB gain is not effective, the gain determining unit 105 outputs the predetermined white balance control value (the second white balance control value) as the final WB gain to the gain multiplication unit 106. The second white balance control value is a WB gain stored in a storage device (not illustrated), for example. The WB gain stored in the storage device is, for example, a WB gain used as the final WB gain in the past or a WB gain determined in advance and included within the predetermined region A1 or A2.

The gain multiplication unit 106 acquires the final WB gain from the gain determining unit 105 and multiplies the input image by the final WB gain, whereby an output image of which white balance has been controlled is generated and output.

Figure 2:
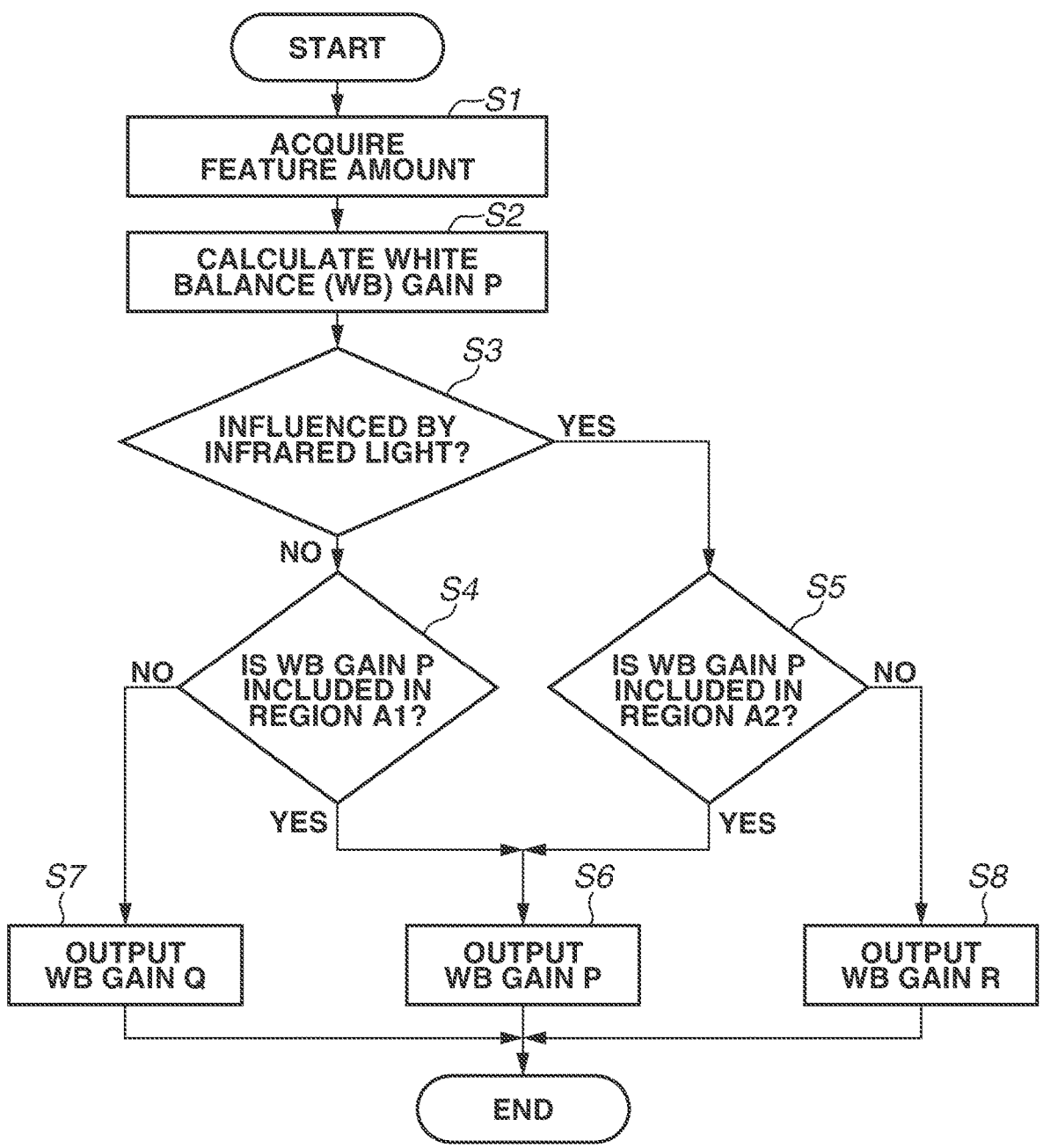
FIG. 2 is a flowchart illustrating a procedure of a main part of image processing according to the present exemplary embodiment.

FIG. 2 is a flowchart illustrating an example of a procedure of a main part of image processing that is executed by the image processing apparatus according to the present exemplary embodiment. With reference to the flowchart illustrated in in FIG. 2, an example of the image processing according to the present exemplary embodiment is described below. In the following description of the flowchart, processing steps are represented using a sign "S".

First, in step S1, the feature amount acquisition unit 101 acquires the feature amount of the colors of the input image.

Next, in step S2, based on the feature amount acquired in step S1, the gain calculation unit 102 calculates a WB gain P which is the first white balance control value.

Next, in step S3, the infrared light detection unit 103 detects whether the colors of the input image are influenced by infrared light captured with the imaging sensor. In a case where the infrared light detection unit 103 detects that the colors of the input image are not influenced by the infrared light (NO in step S3), the processing proceeds to step S4. On the other hand, in a case where the infrared light detection unit 103 detects that the colors of the input image are influenced by infrared light (YES in step S3), the processing proceeds to step S5.

In step S4, the gain determination unit 104 determines whether the WB gain P is included in the region A1. In a case where the WB gain P is included in the region A1 (YES in step S4), the gain determination unit 104 determines that the WB gain P is effective. Then, the processing proceeds to step S6. On the other hand, in a case where the WB gain P is not included in the region A1 (NO in step S4), the gain determination unit 104 determines that the WB gain P is not effective. Then, the processing proceeds to step S7.

In step S5, the gain determination unit 104 determines whether the WB gain P is included in the region A2. In a case where the WB gain P is included in the region A2 (YES in step S5), the gain determination unit 104 determines that the WB gain P is effective. Then, the processing proceeds to step S6. On the other hand, in a case where the WB gain P is not included in the predetermined region A2 (NO in step S5), the gain determination unit 104 determines that the WB gain P is not effective. Then, the processing proceeds to step S8.

In step S6, the gain determining unit 105 outputs the WB gain P (the first white balance control value) as a final WB gain to the gain multiplication unit 106.

In step S7, the gain determining unit 105 outputs, as a predetermined white balance control value (a second white balance control value), a WB gain Q as the final WB gain to the gain multiplication unit 106. The WB gain Q will be described below.

In step S8, the gain determining unit 105 outputs, as the predetermined white balance control value (the second white balance control value), a WB gain R as the final WB gain to the gain multiplication unit 106. The WB gain R will be described below.

White balance gain control according to the present exemplary embodiment and effects of the white balance gain control are described below.

Figure 3:
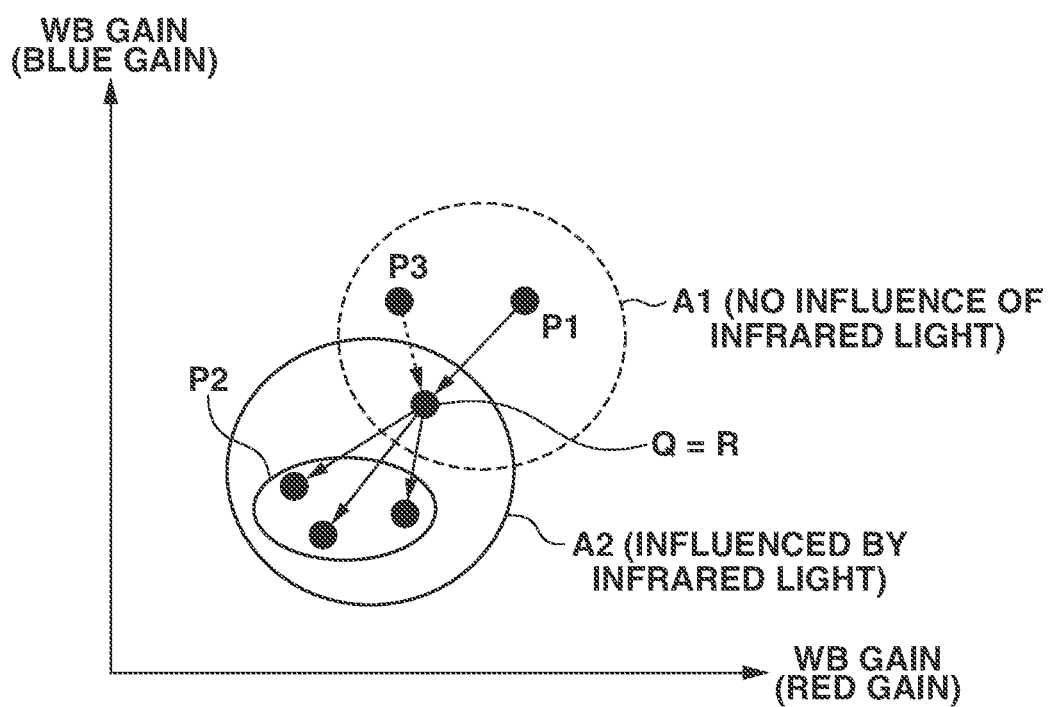
FIG. 3 is a diagram illustrating a first white balance (WB) gain control example according to the first exemplary embodiment.

FIG. 3 is a diagram illustrating a first WB control example as an example of the white balance gain control according to the present exemplary embodiment.

In FIG. 3, the predetermined region A1 indicates the effective range of a WB gain of a case where the colors of the input image are not influenced by infrared light, and is hereinafter referred to as an "effective region A1". The predetermined region A2 indicates the effective range of the WB gain of a case where the colors of the input image are influenced by infrared light, and is hereinafter referred to as an "effective region A2". In the present exemplary embodiment, each effective range is designed such that application of a WB gain within the effective range to the input image leads to appropriate control of the white balance, to avoid giving a user a feeling of discomfort. That is, in a case where the colors of the input image are not influenced by infrared light, a WB gain belonging to the effective region A1 is applied to the input image, whereby image quality deterioration due to inappropriate white balance is able to be prevented. Similarly, in a case where the colors of the input image are influenced by infrared light, a WB gain within the effective region A2 is applied to the input image, whereby image quality deterioration due to inappropriate white balance is able to be prevented.

In FIG. 3, WB gains P1, P2, P3, Q, and R each indicate a WB gain. The WB gain P1 indicates a WB gain that is calculated in a case where the colors of the input image are not influenced by infrared light. The WB gains P2 and P3 each indicate a WB gain that is calculated in a case where the colors of the input image are influenced by infrared light. Three exemplified WB gains included in the WB gain P2 indicate that any WB gain, from among the three WB gains, suitable for an illumination condition of an imaging environment is applied to the input image. On the other hand, the WB gain P3 is a WB gain that is outside the range of the effective region A2 of a case where the colors of the input image are influenced by infrared light, and is not to be applied to the input image. The WB gain Q is a WB gain that is within the range of the effective region A1 and is to be applied to the input image when the WB gain calculated based on the feature amount of the input image is outside the range of the effective region A1 in a case where the colors of the input image are not influenced by infrared light. On the other hand, the WB gain R is a WB gain that is within the range of the effective region A2 and is to be applied to the input image when the WB gain calculated based on the feature amount of the input image is outside the range of the effective region A2 in a case where the colors of the input image are influenced by infrared light. In this example, the WB gains Q and R within a common region between the effective regions A1 and A2, and Q=R. In practice, if the WB gain is changed sharply in a short time, a feeling of discomfort may be given to the user, and thus, control for gradually changing the WB gain over time from a current WB gain to the WB gain P1, P2, Q, or R as a target value is performed.

In conventional white balance control, the effective range of the WB gain is fixed regardless of whether the colors of the input image are influenced by infrared light. Thus, in a case where the colors of the input image are influenced by infrared light, the WB gain indicated by the WB gain P2 in FIG. 3 that is suitable for an illumination conditions of an imaging environment may not be able to be used, or the WB gain indicated by the WB gain P3 may be inappropriately used. Thus, in a case where a difference between a WB gain to be actually used and a suitable WB gain is great, inappropriate white balance may be obtained, which results in image quality deterioration.

In contrast, in the white balance control according to the present exemplary embodiment, the effective range of the WB gain is variable according to determination of whether the colors of the input image are influenced by infrared light. Thus, in the present exemplary embodiment, in a case where the colors of the input image are influenced by infrared light, the WB gain as illustrated by the WB gain P2 in FIG. 3 that is suitable for an illumination condition of an imaging environment is able to be used. On the other hand, in a case where the colors of the input image are influenced by infrared light, even in a case where the WB gain P3 outside the effective range is calculated, the WB gain R within the effective range is used. Thus, image quality deterioration due to inappropriate white balance is able to be prevented.

In the white balance control according to the present exemplary embodiment, the effective region A2 of the WB gain of a case where the colors of the input image are influenced by infrared light is designed in accordance with imaging sensor sensitivity. That is, in the present exemplary embodiment, the position of the effective region A2 of the WB gain is designed such that, with increase in imaging sensor sensitivity, the position of the effective region A2 includes a position further away from the position of the effective region A1 of the WB gain of a case where the colors of the input image are not influenced by infrared light.

Because a ratio of an infrared light component to a visible light component in an imaging environment increases with decrease in the illuminance, intensity of redness of a captured image is increased. To correct the intense redness included in the captured image, it is necessary to apply a WB gain having a great difference from the WB gain of a case where the colors of the input image are not influenced by infrared light. Moreover, because the signal-to-noise (SN) ratio increases with increase in image sensor sensitivity even in a low-illuminance environment, a captured image in which the original colors of an object remain is able to be obtained. Based on the above, with increase in imaging sensor sensitivity, the white balance is able to be controlled more positively in a low-illuminance environment even in a case where the colors of the input image are influenced by infrared light. Thus, it is possible to obtain a color reproducibility improvement effect. On the other hand, in a case where imaging sensor sensitivity is insufficient, and if the white balance is positively controlled, the white balance may greatly affected under influence of noise. That is, in a case where imaging sensor sensitivity is insufficient, even in a case where the colors of the input image are influenced by infrared light, a WB gain having a small difference from the WB gain of a case where the colors of the input image are not influenced by infrared light is used, whereby the white balance is able to be prevented from being greatly affected.

Based on these facts, in the white balance control according to the present exemplary embodiment, with increase in imaging sensor sensitivity, the white balance is controlled more positively even in a case where the colors of the input image are influenced by infrared light. That is, in the white balance control according to the present exemplary embodiment, with increase in imaging sensor sensitivity, the WB gain more greatly different from the WB gain of a case where the colors of the input image are not influenced by infrared light is used. Consequently, the white balance is able to be prevented from being greatly affected, and color reproducibility of a captured image at a low illuminance is also improved.

While, in the present exemplary embodiment, the infrared light detection unit 103 detects the state of the insertion and removal of the IRCF, the present invention is not limited to this. For example, in a case of an imaging apparatus including an infrared illumination unit (not illustrated), in accordance with on and off states of an infrared illumination, detection of whether the colors of the input image are influenced by infrared light is performed. That is, in a case where the infrared illumination unit emits infrared light, it can be detected that the colors of the input image are influenced by the infrared light. In a case where the infrared illumination unit does not emit infrared light, it can be detected that the colors of the input image are not influenced by the infrared light. Alternatively, the user can be allowed to set whether the colors of the input image are influenced by the infrared light. That is, a WB control mode of a case where the colors of the input image are influenced by the infrared light and a WB control mode of a case where the colors of the input image are not influenced by the infrared light are provided to allow the user to select either of the WB control modes.

The gain determining unit 105 can output the WB gain Q or R to the gain multiplication unit 106 only at a timing when a detection result of the infrared light detection unit 103 changes. For example, when the colors of the input image are influenced by infrared light, and a WB gain calculated by the gain calculation unit 102 is outside the range of the effective region A2, the gain determining unit 105 outputs, in a case where a WB gain currently used based on a WB gain calculated in the past is within the range of the effective region A2, not the WB gain R but the current WB gain. On the other hand, at a timing of removal of the IRCF, a currently applied WB gain is a WB gain obtained when the IRCF has been inserted, and is within the range of the effective region A1. Thus, the gain determining unit 105 outputs the WB gain R within the range of the effective region A2. That is, when the colors of the input image are influenced by infrared light, the gain determining unit 105 outputs, only in a case where a currently applied WB gain is outside the range of the effective region A2, the WB gain R within the range of the effective region A2.

Figure 4:
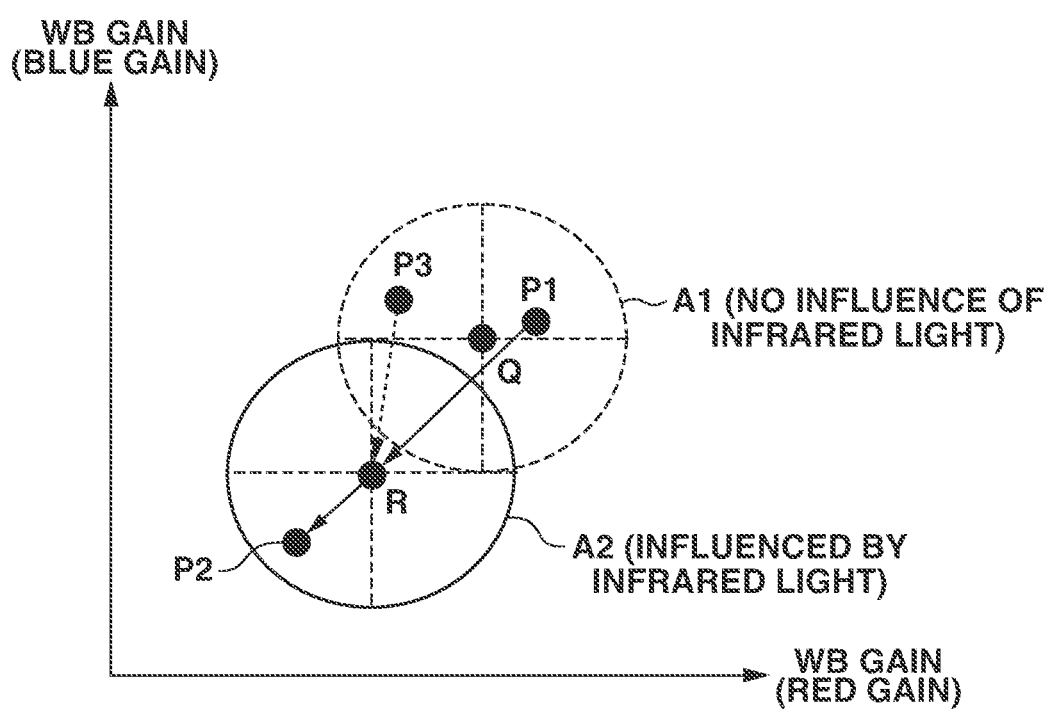
FIG. 4 is a diagram illustrating a second white balance (WB) gain control example according to the first exemplary embodiment.

FIG. 4 is a diagram illustrating a second WB control example according to the present exemplary embodiment.

In the second WB control example illustrated in FIG. 4, the gain determining unit 105 sets the WB gains Q and R at the centers of the effective regions A1 and A2, respectively. In this manner, an average WB gain in each effective region is able to be used. Consequently, regardless of which gain within an effective region is a true (suitable) WB gain, a difference between a WB gain to be applied and the true (suitable) WB gain is able to be reduced. Thus, the white balance is able to be prevented from being greatly affected. Since it is possible to reduce the difference between the WB gain to be applied and the true (suitable) WB gain, the time required for a convergence of the WB gain to a true value (a suitable value) is able to be minimized in a case where the WB gain is gradually controlled over time.

Figure 5:
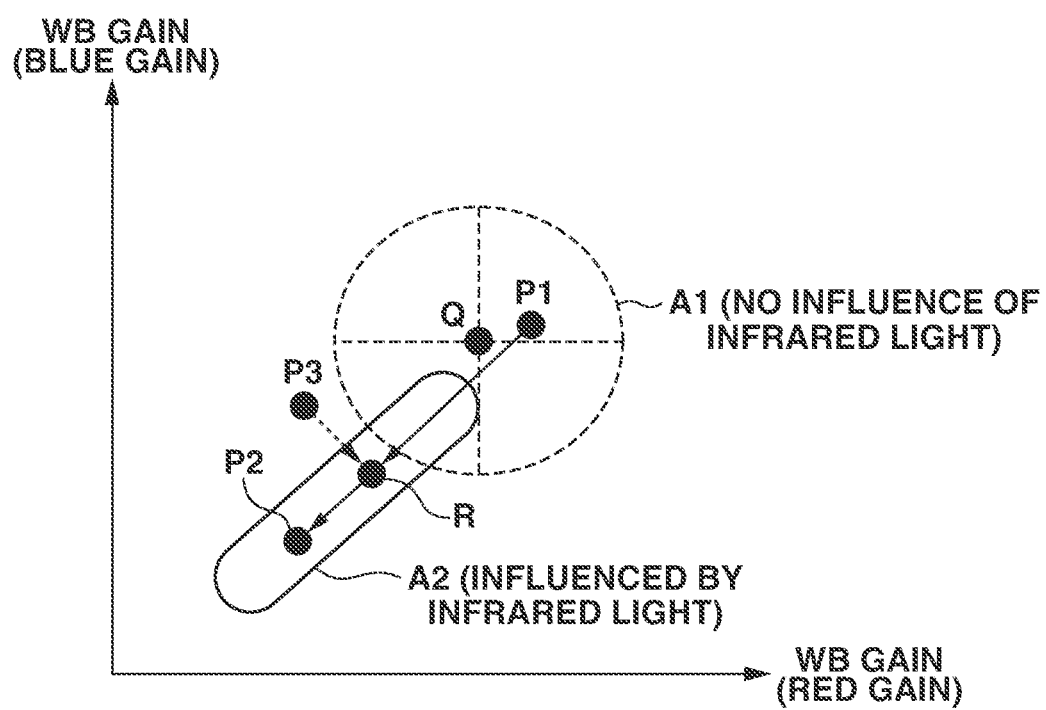
FIG. 5 is a diagram illustrating a third white balance (WB) gain control example according to the first exemplary embodiment.

FIG. 5 is a diagram illustrating a third WB control example according to the present exemplary embodiment.

In the third WB control example illustrated in FIG. 5, the gain determining unit 105 sets the WB gain R to not a WB gain determined in advance within the region A2, but a WB gain that is the closest to the WB gain P3 within the region A2. The gain determination unit 104 may set the effective region A2 of a case where the colors of the input image are influenced by infrared light to be smaller than the effective region A1 of a case where the colors of the input image are not influenced by infrared light. In a case where the colors of the input image are influenced by infrared light, colors of an object may be greatly affected depending on a material of the object. If the white balance is controlled based on the colors, the white balance may also be greatly affected. As illustrated in FIG. 5, in a case where the colors of the input image are influenced by infrared light, the effective region A2 of the WB gain is set to be smaller, whereby the white balance is prevented from being greatly affected due to application of an unexpected WB gain. In a case where the effective region A2 is set to be smaller, the calculated WB gain often falls outside the effective region A2. In this case, if the WB gain R is set to a fixed value, dynamical control to adjust the white balance to be suitable is not able to be performed in accordance with a change in the illumination conditions. Thus, the WB gain R is set to a WB gain that is obtained outside the effective region A2 as the WB gain closest to the WB gain P3 and is within the effective region A2, whereby the white balance is dynamically adjusted to be suitable in accordance with a change in an illumination condition.

Figure 6:
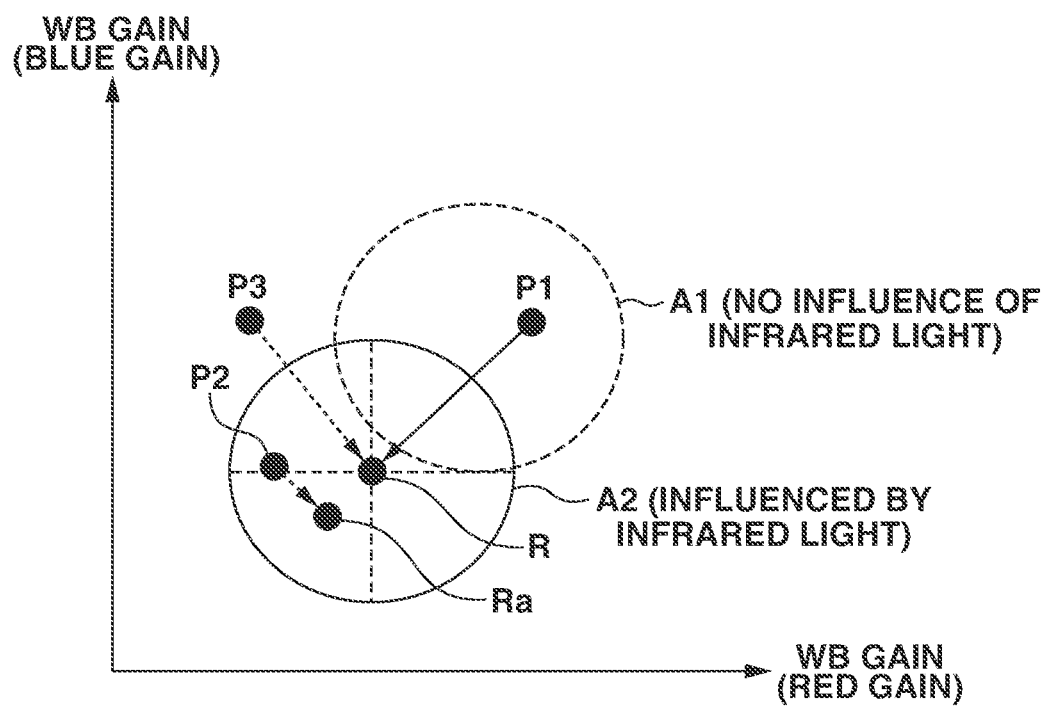
FIG. 6 is a diagram illustrating a fourth white balance (WB) gain control example according to the first exemplary embodiment.

FIG. 6 is a diagram illustrating a fourth WB control example according to the present exemplary embodiment.

In the fourth WB control example in FIG. 6, the gain determining unit 105 sets the WB gain P2 calculated in a case where the colors of the input image are influenced by infrared light, to a WB gain Ra that is within the effective region A2 of the WB gain of a case where the colors of the input image are influenced by infrared light. Alternatively, the gain determining unit 105 can output the WB gain P3 calculated in a case where the colors of the input image are influenced by infrared light, as the WB gain R that is within the effective region A2 of the WB gain of a case where colors of the input image are influenced by infrared light. The WB gain P2 is within the range of the effective region A2 of the WB gain of a case where the colors of the input image are influenced by infrared light, and the WB gain P3 is outside the range of the effective region A2 of the WB gain of a case where the colors of the input image are influenced by infrared light. Then, the WB gain Ra is a WB gain that is within the range of the effective region A2 and is determined in advance to appropriately control the white balance.

Even in a case where the colors of the input image are influenced by infrared light, it is necessary to set the effective region A2 to be wide to dynamically control the white balance. If, however, the effective region A2 is set to be wide, the range of a WB gain that can be used increases. Consequently, the white balance may be affected due to application of an unexpected WB gain. Accordingly, in the fourth WB control example, even if the calculated WB gain (e.g., the WB gain P2) is within the range of the effective region A2, a WB gain within a more limited range (e.g., the WB gain Ra) is used. Thus, the white balance is prevented from being greatly affected due to application of an unexpected WB gain. Even in a case where the colors of the input image are influenced by infrared light, color reproducibility of a captured image is able to be improved by appropriate control of the white balance.

As described above, based on the image processing apparatus according to the present exemplary embodiment, appropriate image data in accordance with the insertion and removal of the IRCF is able to be generated.

Second Exemplary Embodiment

Figure 7:
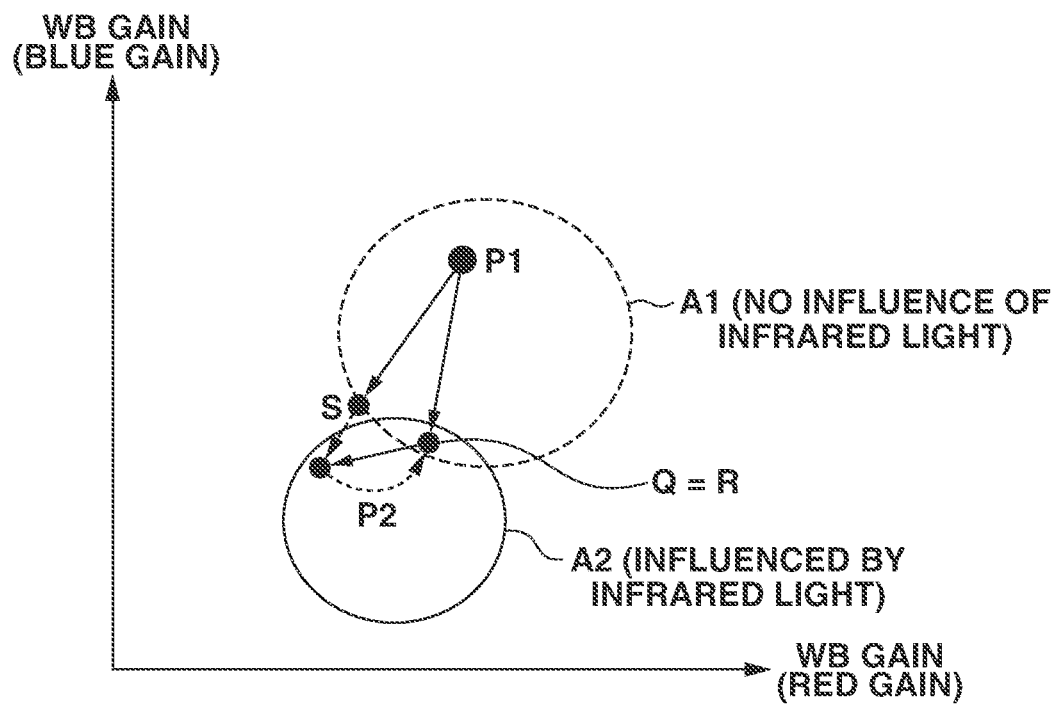
FIG. 7 is a diagram for description of an operation of a gain determining unit according to a second exemplary embodiment.

Next, with reference to FIG. 7, an image processing apparatus according to a second exemplary embodiment is described. In white balance control according to the second exemplary embodiment, a WB gain is gradually changed over time to prevent image quality from being deteriorated with a sharp change in the WB gain.

The functional configuration of the image processing apparatus according to the present exemplary embodiment is similar to that according to the first exemplary embodiment, and the redundant drawings are omitted. Descriptions for functional units similar to those in the first exemplary embodiment are omitted, and only functional units having functions different from the first exemplary embodiment are described below.

The gain determining unit 105 acquires a WB gain from the gain calculation unit 102 and acquires, from the gain determination unit 104, the result of the determination of whether the WB gain is effective. Further, based on the acquired information and a current WB gain stored in the gain determining unit 105, the gain determining unit 105 determines a final WB gain. Then, in the second exemplary embodiment, the gain determining unit 105 outputs, to the gain multiplication unit 106, a WB gain that gradually changes from the current WB gain to the final WB gain. The current WB gain is a WB gain calculated in the past and set in the gain multiplication unit 106, and for example, is a WB gain applied to an input image of the previous frame in a moving image.

FIG. 7 is a diagram illustrating an operation of the gain determining unit 105 according to the second exemplary embodiment.

In FIG. 7, a WB gain P1 is the current WB gain, and a WB gain P2 is the WB gain that is calculated by the gain calculation unit 102 in a case where the colors of the input image are influenced by infrared light. In a case where the colors of the input image are influenced by the infrared light, the WB gain P2 is a WB gain within the effective region A2, and thus, the gain determining unit 105 sets the WB gain P2 as the final WB gain.

If the WB gain is sharply changed, the colors may suddenly change, or in some cases, the colors may repeatedly change many times in a short period, and the white balance may fluctuate, which deteriorates image quality. To prevent this, the gain determining unit 105 sequentially calculates a plurality of WB gains between the WB gains P1 and P2 such that the WB gain gradually changes from the WB gain P1 to the WB gain P2. Then, the gain determining unit 105 outputs the plurality of WB gains. That is, the gain determining unit 105 sets a target WB gain to gradually change the WB gain and sequentially calculates WB gains with which the WB gain to be applied to the input image (the current WB gain) gradually comes close to the target WB gain. Then, the gain determining unit 105 outputs the WB gains.

More specifically, the gain determining unit 105 controls the target WB gain in accordance with determination of whether the current WB gain belongs to only the effective region A1, or belongs to only the effective region A2, or belongs to a common region between the effective regions A1 and A2. For example, in a case where the current WB gain belongs to the effective region A1 except for the common region between the effective regions A1 and A2 (e.g., the position of P1 in FIG. 7), the gain determining unit 105 sets a WB gain belonging to the common region between the effective regions A1 and A2 (e.g., the position of R in FIG. 7) as the target WB gain. Then, the gain determining unit 105 sets the WB gain such that the current WB gain gradually comes close to the WB gain R.

Next, after the current WB gain reaches the WB gain R belonging to the common region between the effective regions A1 and A2, the gain determining unit 105 sets the target WB gain to the originally calculated WB gain P2. That is, in a case where the current WB gain belongs to the common region between the effective regions A1 and A2, the gain determining unit 105 sets the target WB gain to a WB gain belonging to the effective region A2 except for the common region between the effective regions A1 and A2 (e.g., the position of P2 in FIG. 7). Then, the gain determining unit 105 sets the WB gain such that the current WB gain gradually changes over time from the WB gain R to the WB gain P2 which is the final target. Then, the gain determining unit 105 outputs the WB gain.

In a case where the WB gain is gradually changed over time as in the second exemplary embodiment, generally, for example, the WB gain is changed from the WB gain P1 to the WB gain P2 in FIG. 7 by gradually changing the WB gain along a straight line connecting the WB gains P1 and P2. However, in a case where the WB gain is changed over the effective regions A1 and A2 different from each other, the straight line connecting the WB gains P1 and P2 may cross a region included in neither of the effective regions A1 and A2 as illustrated in FIG. 7 depending on the shapes of the regions. In this case, the WB gain may stop (converge) at the position of a gain S in FIG. 7, and may not be able to be changed to the WB gain P2. That is, the white balance may not be adjusted to be appropriate.

In the present exemplary embodiment, until the current WB gain changes from one of two effective regions and reaches a common region between the two effective regions, the target WB gain is set to a first target WB gain belonging to the common region between the two effective regions. Then, after the current WB gain reaches the common region between the two effective regions, the target WB gain is changed from the first target WB gain to a second target WB gain (a final WB gain) belonging to the other effective region. In this configuration, the WB gain is prevented from converging before reaching the original final WB gain, and thus control to adjust the white balance to be appropriate is able to be performed.

Alternatively, at a timing immediately after a change in the result of the determination of whether the colors of the input image are influenced by infrared light, i.e., immediately after a change in the effective region of the WB gain, the gain determining unit 105 can set the target WB gain to a WB gain belonging to the common region between the two effective regions. Yet alternatively, at a timing immediately after a change in the result of the determination of whether the colors of the input image are influenced by infrared light, the gain determining unit 105 can output a WB gain belonging to the common region between the two effective regions. At the timing of the change in the result of the determination of whether the colors of the input image are influenced by infrared light, the colors of the input image greatly change, and thus, image quality deterioration may be less recognizable even when the white balance greatly changes. Thus, at a timing immediately after the change in the result of the determination of whether the colors of the input image are influenced by infrared light, the gain determining unit 105 changes the WB gain to be applied to the input image, for example, from the WB gain P1 to the WB gain R in FIG. 7. Then, the gain determining unit 105 gradually changes the WB gain from the WB gain R to the WB gain P2 in FIG. 7. In the configuration as described above, the WB gain is prevented from converging before reaching the original final target WB gain, and the time required for the WB gain to reach the original final target WB gain is shortened.

Third Exemplary Embodiment

An image processing apparatus according to a third exemplary embodiment is described below. In the above described exemplary embodiments, the white balance is controlled based on determination of whether the colors of the input image are influenced by infrared light captured with the imaging sensor, i.e., whether the IRCF is inserted or removed, the infrared illumination is lightened or extinguished, or the mode is switched by the user.

In contrast, in the third exemplary embodiment, magnitude of an influence of infrared light on the colors of the input image is detected, and the white balance is controlled in accordance with magnitude of the influence of infrared light. Thus, in the third exemplary embodiment, even in a case where the colors of the input image are always influenced by infrared light captured with the imaging sensor, appropriate white balance control is able to be performed according to the relative magnitude of the influence.

Figure 8:
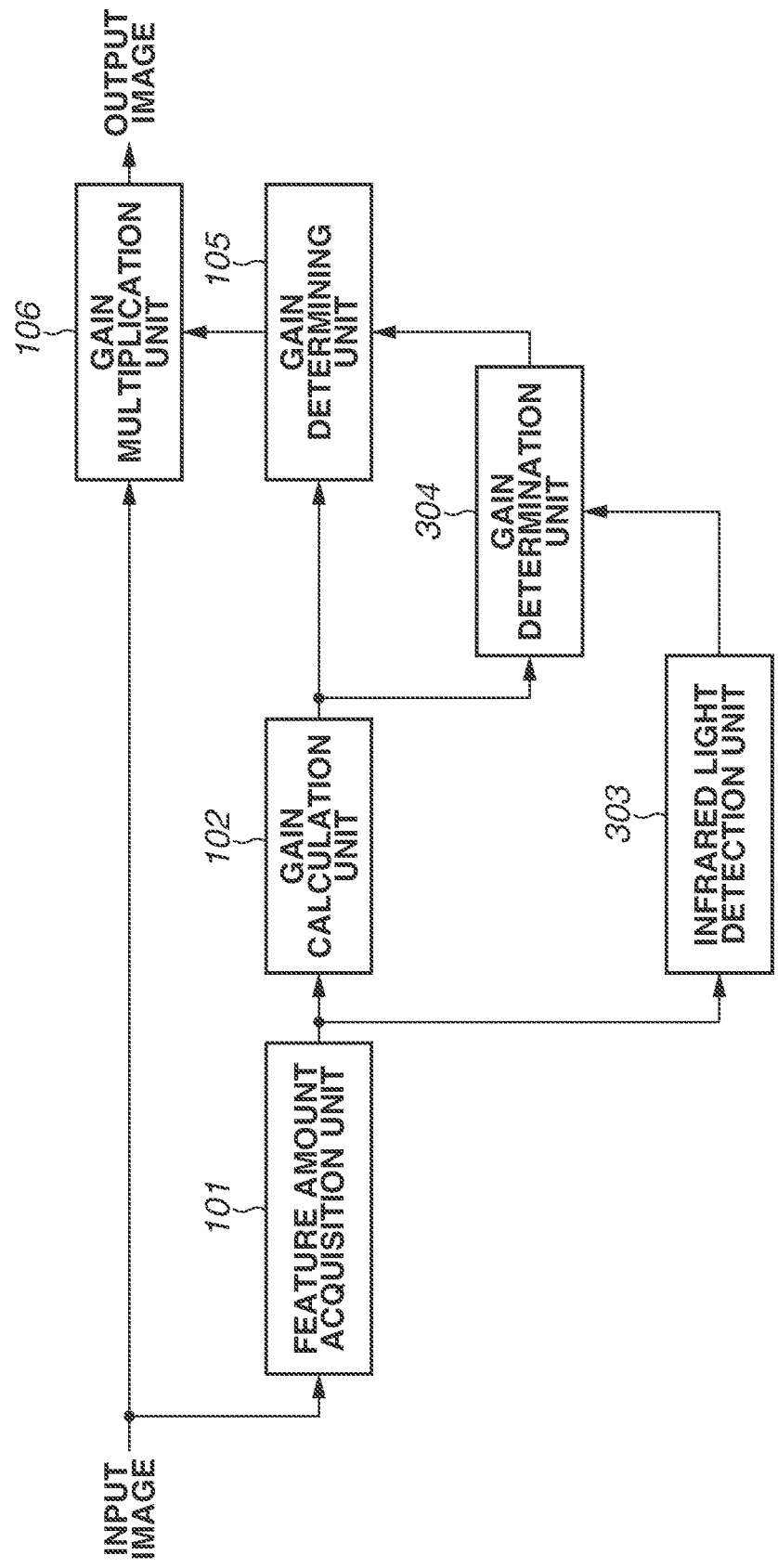
FIG. 8 is a diagram illustrating an example of a configuration of an image processing apparatus according to a third exemplary embodiment.

FIG. 8 is a configuration diagram illustrating an example of the functional configuration of the image processing apparatus according to the third exemplary embodiment. Functional units similar to those in the first exemplary embodiment are designated by the same signs, and the redundant descriptions are omitted.

An infrared light detection unit 303 acquires a feature amount of the colors of the input image from the feature amount acquisition unit 101. Then, based on the feature amount of the colors of the input image, the infrared light detection unit 303 detects magnitude of influence of infrared light captured with the imaging sensor on the colors of the input image. Then, the infrared light detection unit 303 outputs a result of the detection to a gain determination unit 304. More specifically, the infrared light detection unit 303 calculates an average value of the colors of the input image and performs the detection such that the greater the red color component of the calculated color average value, the greater magnitude of the influence of infrared light is exerted. On the other hand, the infrared light detection unit 303 performs the detection such that the smaller the red color component of the calculated color average value, the smaller magnitude of the influence of the infrared light is exerted.

According to the result of the detection acquired from the infrared light detection unit 303, the gain determination unit 304 performs the determination of whether a WB gain acquired from the gain calculation unit 102 is effective. Then, the gain determination unit 304 outputs a result of the determination to the gain determining unit 105. More specifically, in accordance with the magnitude of the influence of infrared light on the colors of the input image, the gain determination unit 304 uses a different determination condition to perform the determination of whether the WB gain is effective. For example, when the magnitude of the influence of infrared light on the colors of the input image is small, and in a case where the WB gain is within a predetermined region (an effective region A20 in FIG. 9), the gain determination unit 304 determines that the WB gain is effective. When the magnitude of the influence of infrared light on the colors of the input image is medium, and in a case where the WB gain is within a predetermined region (an effective region A21 in FIG. 9), the gain determination unit 304 determines that the WB gain is effective. When the magnitude of the influence of infrared light on the colors of the input image is great, and in a case where the WB gain is within a predetermined region (A22), the gain determination unit 304 determines that the WB gain is effective. Further, for example, the gain determination unit 304 sets the positions of the predetermined regions in such a manner that a distance between the regions is increased with increase in the difference in the magnitudes of the influence of infrared light on the colors of the input image. The determination of whether the magnitude of the influence of infrared light on the colors of the input image is small, great, or medium may be performed based on, for example, determination of whether the magnitude is within an effective range corresponding to each level, or may be performed using comparison with a threshold corresponding to each level.

Figure 9:
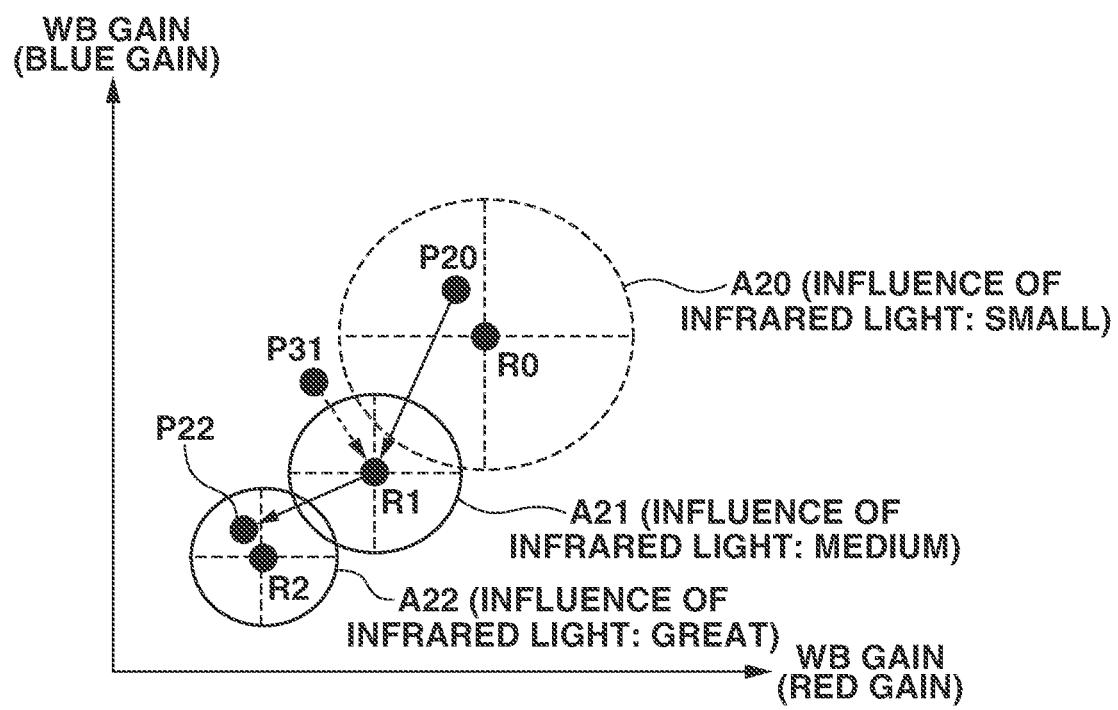
FIG. 9 is a diagram illustrating an example of WB gain control according to the third exemplary embodiment.

FIG. 9 is a diagram illustrating operations of the gain determination unit 304 and the gain determining unit 105 according to the third exemplary embodiment.

A region A20 in FIG. 9 indicates an effective range of a case where the magnitude of the influence of infrared light on the colors of the input image is small (an "effective region A20"). A region A21 in FIG. 9 indicates an effective range of a case where the magnitude of the influence of infrared light on the colors of the input image is medium (an "effective region A21"). A region A22 in FIG. 9 indicates an effective range of a case where the magnitude of the influence of infrared light on the colors of the input image is great (an "effective region A22"). A WB gain included in each effective range is a WB gain that, when applied to the input image, results in outputting an output image having appropriate white balance. A WB gain P20 in FIG. 9 indicates an effective WB gain calculated in a case where the magnitude of the influence of infrared light on the colors of the input image is small and the effective region A20 is set, and belonging to the effective region A20. A WB gain P22 in FIG. 9 indicates an effective WB gain calculated in a case where the magnitude of the influence of infrared light on the colors of the input image is great and the effective region A22 is set, and belonging to the effective region A22. A WB gain P31 in FIG. 9 indicates an ineffective WB gain that is calculated in a case where the magnitude of the influence of infrared light on the colors of the input image is medium and the effective region A21 is set, and does not belong to the effective region A21. A WB gain R1 in FIG. 9 indicates a WB gain to be applied, when the magnitude of the influence of infrared light on the colors of the input image is medium and the effective region A21 is set, to the input image in a case where the calculated WB gain is outside the effective region A21.

In the white balance control according to the present exemplary embodiment, in a case where the influence of infrared light on the colors of the input image is small, the WB gain P20 is used. In a case where the influence is medium, the WB gain R1 is used. In a case where the influence is great, the WB gain P22 is used. In the present exemplary embodiment, the effective range of a suitable WB gain is able to be set in accordance with the magnitude of the influence of infrared light on the colors of the input image.

Thus, even in a case where infrared light is captured with the imaging sensor, the color reproducibility of a captured image is able to be improved, and the white balance is prevented from being greatly affected.

The infrared light detection unit 303 calculates the average value of the colors of the input image and detects such that the greater the red color component of the calculated color average value, the greater magnitude of the influence of infrared light is exerted. However, the method for detecting the magnitude of the influence of infrared light is not limited to this. For example, the infrared light detection unit 303 can acquire illuminance information on an imaging environment and detect such that the lower the illuminance, the greater magnitude of the influence of infrared light is exerted. The illuminance information can be calculated based on brightness of the input image, or can be calculated based on an exposure condition. Alternatively, an illuminance sensor (not illustrated) can be disposed, and the illuminance information can be calculated based on a value read with the illuminance sensor. Alternatively, based on a distribution of color information on each region in the input image, the infrared light detection unit 303 can detect such that the greater the bias of the distribution of the color information, the greater magnitude of the influence of infrared light is exerted. The reason is that since color components of the object is decreased with increase in the influence of infrared light, redness of infrared light but not the colors of the object is dominant in colors of a captured image, which leads to an imbalance in the distribution of the color information toward the periphery of the red color.

As illustrated in FIG. 9, the gain determination unit 304 can perform control in such a manner that the greater the influence of infrared light on the colors of the input image, the smaller the size of the effective range of the WB gain is set. With increase in the magnitude of the influence of infrared light on the colors of the input image, the original color components of the object are decreased, which may lead to increase in the amount of noise due to insufficiency of imaging sensor sensitivity. Consequently, an unexpected WB gain may be calculated, and the white balance may be greatly affected. Thus, with increase in the magnitude of the influence of infrared light on the colors of the input image, the size of the effective range of the WB gain is decreased, which prevents an unexpected WB gain from being used and adjusts the white balance to be appropriate.

Fourth Exemplary Embodiment

An image processing apparatus according to a fourth exemplary embodiment is described below. In the above described exemplary embodiments, even in a case where the colors of the input image are influenced by infrared light captured with the imaging sensor, the white balance is appropriately controlled, and an output image having a chromatic color is output. In contrast, in the fourth exemplary embodiment, in a case where the colors of the input image are influenced by infrared light captured with the imaging sensor, switching of a setting of an output image between a chromatic color and an achromatic color is performed in accordance with the magnitude of the influence of infrared light.

Figure 10:
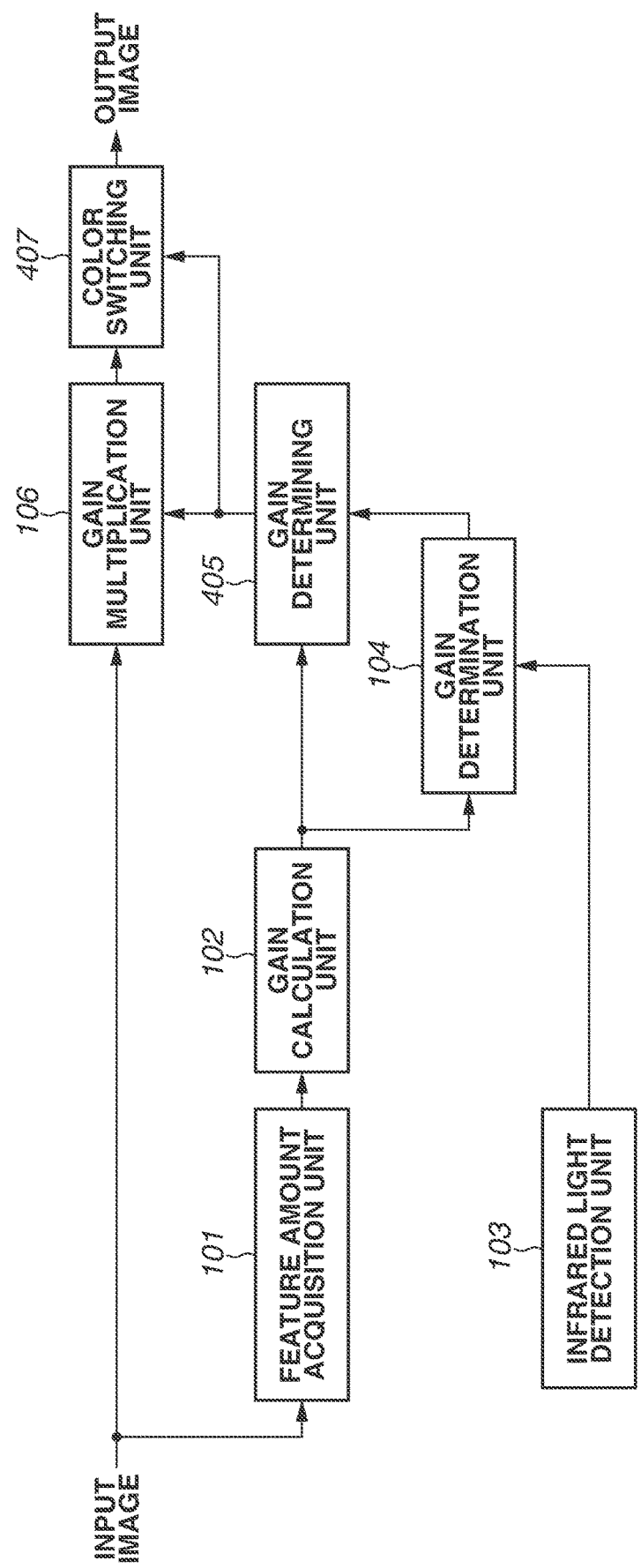
FIG. 10 is a diagram illustrating an example of a configuration of an image processing apparatus according to a fourth exemplary embodiment.

FIG. 10 is a configuration diagram illustrating an example of the functional configuration of the image processing apparatus according to the fourth exemplary embodiment. Functional units similar to those in the first exemplary embodiment are designated by the same signs, and the redundant descriptions are omitted.

A gain determining unit 405 acquires a WB gain from the gain calculation unit 102 and acquires, from the gain determination unit 104, the result of the determination of whether the WB gain is effective. Then, the gain determining unit 405 determines a final WB gain and outputs the final WB gain to the gain multiplication unit 106. Based on the WB gain calculated by the gain calculation unit 102, the gain determining unit 405 further performs determination of whether to set an output image to a chromatic color or an achromatic color. Then, the gain determining unit 405 outputs a result of the determination to a color switching unit 407. In a case where the gain determining unit 405 determines that the output image is to be set to an achromatic color, the gain determining unit 405 outputs a WB gain determined in advance as the final WB gain to the gain multiplication unit 106.

The color switching unit 407 acquires, from the gain determining unit 405, the result of the determination of whether to set the output image to a chromatic color or an achromatic color. In a case where the output image is to be set to an achromatic color, the color switching unit 407 converts the colors of the input image into an achromatic color and outputs the output image.

Figure 11:
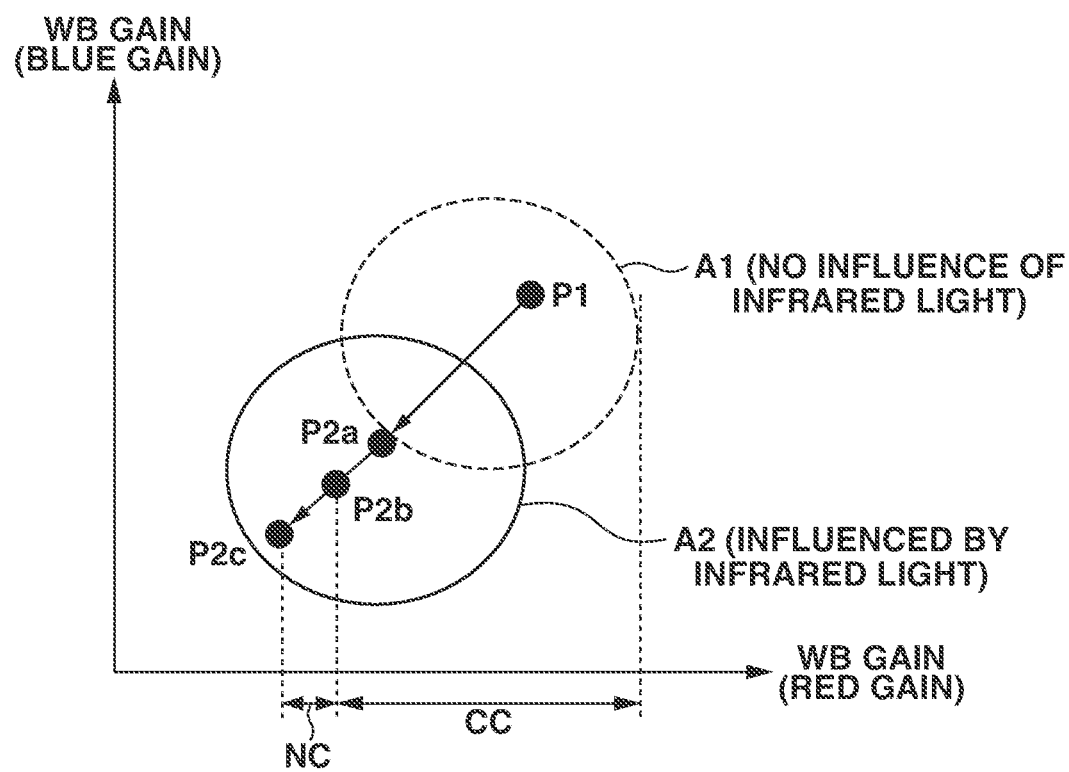
FIG. 11 is a diagram for description of an operation of a gain determining unit according to the fourth exemplary embodiment.

FIG. 11 is a diagram illustrating WB gain control according to the fourth exemplary embodiment.

In FIG. 11, a region A1 indicates an effective range of the WB gain of a case where the colors of the input image are not influenced by infrared light (an effective region A1). A region A2 indicates an effective range of the WB gain of a case where the colors of the input image are influenced by infrared light (an effective region A2). A WB gain within each effective range is applied to the input image, whereby an output image is generated. Each effective range is designed such that application of a WB gain within the effective range to the input image leads to appropriate control of the white balance, to avoid giving a user a great feeling of discomfort.

Among WB gains P1, P2a, P2b, and P2c illustrated in FIG. 11, the WB gain P1 is a WB gain that is calculated in a case where the colors of the input image are not influenced by infrared light. On the other hand, each of the WB gains P2a, P2b, and P2c is a WB gain that is calculated in a case where the colors of the input image are influenced by infrared light.

The redness of the input image is increased with decrease in illuminance of an imaging environment and increase in the magnitude of the influence of infrared light on the colors of the input image. Thus, the WB gain of a case where the colors of the input image are influenced by infrared light has a great difference from the WB gain of a case where the colors of the input image are not influenced by infrared light. That is, the WB gain P2a is a WB gain of a case where the influence of infrared light is relatively small. The WB gain P2b is a WB gain of a case where the influence of infrared light is medium. The WB gain P2c is a WB gain of a case where the influence of infrared light is relatively great. In a case where the influence of infrared light on the colors of the input image is great, original color components of the object are small. Thus, even if the white balance is appropriately controlled, a sufficient color reproducibility improvement effect is not be able to be obtained depending on imaging sensor sensitivity. On the other hand, the amount of noise increases, and thus, the white balance may not be able to be adjusted to be appropriate.

Thus, in a case where the WB gain (the Red gain) is within a predetermined range, such as a range where the WB gain is greater than the WB gain P2b, the gain determining unit 405 determines that the output image is to be set to a chromatic color CC. The gain determining unit 405 also sets the WB gain calculated by the gain calculation unit 102 as the final WB gain. Thus, the white balance is dynamically controlled in accordance with the calculated WB gain. In a case where, on the other hand, the WB gain (the Red gain) is within a predetermined range, such as a range where the WB gain is smaller than the WB gain P2b, the gain determining unit 405 determines that the output image is to be set to an achromatic color NC. Then, the gain determining unit 405 applies a fixed WB gain determined in advance. In this WB gain control, in a case where imaging sensor sensitivity is sufficient, the white balance is controlled in accordance with the influence of infrared light on the colors of the input image, whereby the effect of improving the color reproducibility of a captured image is able to be obtained. In a case where, on the other hand, imaging sensor sensitivity is insufficient, the WB gain is set to a fixed value, and the output image is set to an achromatic color, whereby displaying of an image, the white balance of which is greatly affected, is prevented.

While the gain determining unit 405 uses the Red gain in the determination of whether to set the output image to an achromatic color or a chromatic color, the present invention is not limited to this. The gain determining unit 405 can use the Blue gain in the determination of whether to set the output image to an achromatic color or a chromatic color. Alternatively, the gain determining unit 405 can acquire illuminance information on an imaging environment. In a case where the illuminance is low, the gain determining unit 405 determines that the output image is to be set to an achromatic color. In a case where the illuminance is high, the gain determining unit 405 determines that the output image is to be set to a chromatic color.

Fifth Exemplary Embodiment

An image processing apparatus according to a fifth exemplary embodiment is described below. In the above described exemplary embodiments, the control is performed such that a WB gain is uniformly applied to the entire area of an image. In contrast, in the fifth exemplary embodiment, magnitude of the influence of infrared light on the colors of the input image is determined on a pixel by pixel basis, and based on a result of the determination on a pixel by pixel basis, a WB gain is set for each pixel.

A functional configuration diagram of the image processing apparatus according to the present exemplary embodiment is similar to that according to the first exemplary embodiment, and the redundant descriptions are omitted. Functional units similar to those in the first exemplary embodiment are omitted, and only functional units having functions different from the first exemplary embodiment are described below.

The gain multiplication unit 106 acquires a WB gain determined by the gain determining unit 105 and multiplies the input image by the WB gain, to generate an output image. Then, the gain multiplication unit 106 outputs the output image. In the case of the fifth exemplary embodiment, the gain multiplication unit 106 further has a function of calculating a luminance value of each pixel based on the acquired input image and setting a final WB gain for each pixel based on the luminance value. That is, based on the luminance value of each pixel, the gain multiplication unit 106 according to the fifth exemplary embodiment applies a WB gain set on a pixel by pixel basis as the final WB gain to the input image.

In the case of the fifth exemplary embodiment, the gain multiplication unit 106 calculates brightness of each pixel included in the input image. Then, the gain multiplication unit 106 applies the WB gain determined by the gain determining unit 105 as the final WB gain to a pixel having brightness of less than a predetermined value. On the other hand, the gain multiplication unit 106 sets a third white balance control value as a predetermined white balance control value for a pixel having brightness of greater than or equal to a predetermined value. Then, the gain multiplication unit 106 is to use the third white balance control value as the final WB gain. In the present exemplary embodiment, the third white balance control value is a WB gain determined in advance.

Figure 12:
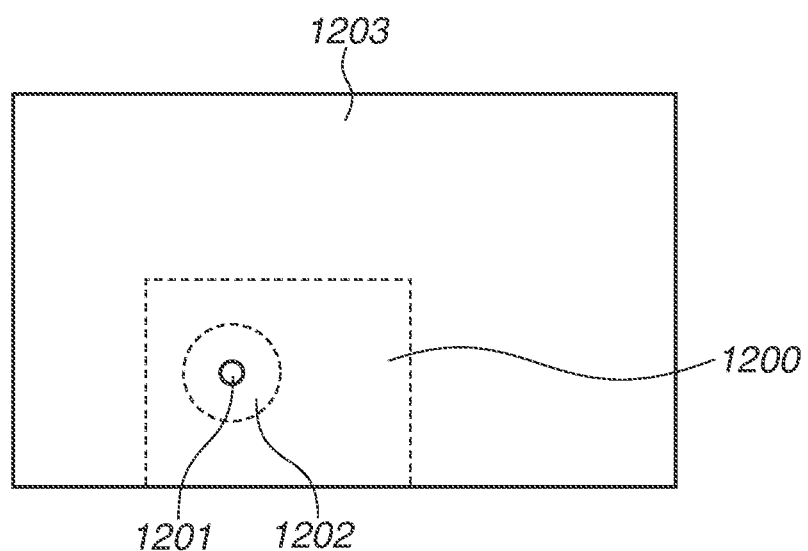
FIG. 12 is a diagram illustrating an example of an input image according to a fifth exemplary embodiment.

With reference to FIG. 12, a use case example in the present exemplary embodiment is described.

FIG. 12 illustrates an object 1200 present in a low-illuminance environment. The object 1200 includes a light source 1201, such as a light-emitting diode (LED) indicator. For example, the object 1200 is an apparatus installed in an unmanned facility and includes an LED indicator indicating an operation state of the apparatus. The apparatus as the object 1200 causes the LED indicator to emit light for the purpose of issuing an alert in a case where some abnormality occurs in the apparatus.

In such a case, since the environment where the object 1200 is present has a low illuminance, the influence of infrared light on colors of the input image is great. In a region 1202 of an image of a peripheral portion of the LED indicator, however, when the LED indicator emits visible light, the influence of infrared light on the colors of the input image is small. In such a case, in terms of an area ratio in the image, the area of a region 1203 where the influence of infrared light on the colors of the input image is great is greater than that of the region 1202. Thus, if white balance control is uniformly performed on the entire area of the image, a WB gain suitable for an image of the region 1203 where the influence of infrared light is great is applied to the entire area of the image. That is, the WB gain suitable for the image of the region 1203 where the influence of infrared light is great is also applied to the region 1202 on the periphery of the LED indicator where the influence of infrared light is small. As a result, the white balance of the region 1202 on the periphery of the LED indicator where the influence of infrared light is small may not be able to be appropriately controlled. Consequently, the correct color of the LED indicator may not be able to be identified. More specifically, an alert issued by the apparatus may be overlooked.

In a case as described above where there are the region 1202 where visible light is dominant and the region 1203 where infrared light is dominant, a pixel value having a high luminance is obtained in the region 1202 where visible light is dominant, particularly a portion where the light source is present. Thus, the gain multiplication unit 106 according to the present exemplary embodiment determines that a high-luminance region in the input image is a region where visible light is dominant. On the other hand, the gain multiplication unit 106 determines that a low-luminance region in the input image is a region where infrared light is dominant. Then, the gain multiplication unit 106 sets the third white balance control value as a WB gain suitable for visible light for the region where visible light is dominant, i.e., the high-luminance region. In the present exemplary embodiment, the third white balance control value suitable for visible light is a WB gain suitable for a light source at a predetermined color temperature, such as a white light source at 5600 kelvins (K). On the other hand, the gain multiplication unit 106 applies the WB gain of a case where the colors of the input image are influenced by infrared light to the region where infrared light is dominant, i.e., the low-luminance region. That is, the gain multiplication unit 106 applies the WB gain acquired from the gain determining unit 105 to a pixel in the low-luminance region.

Figure 13:
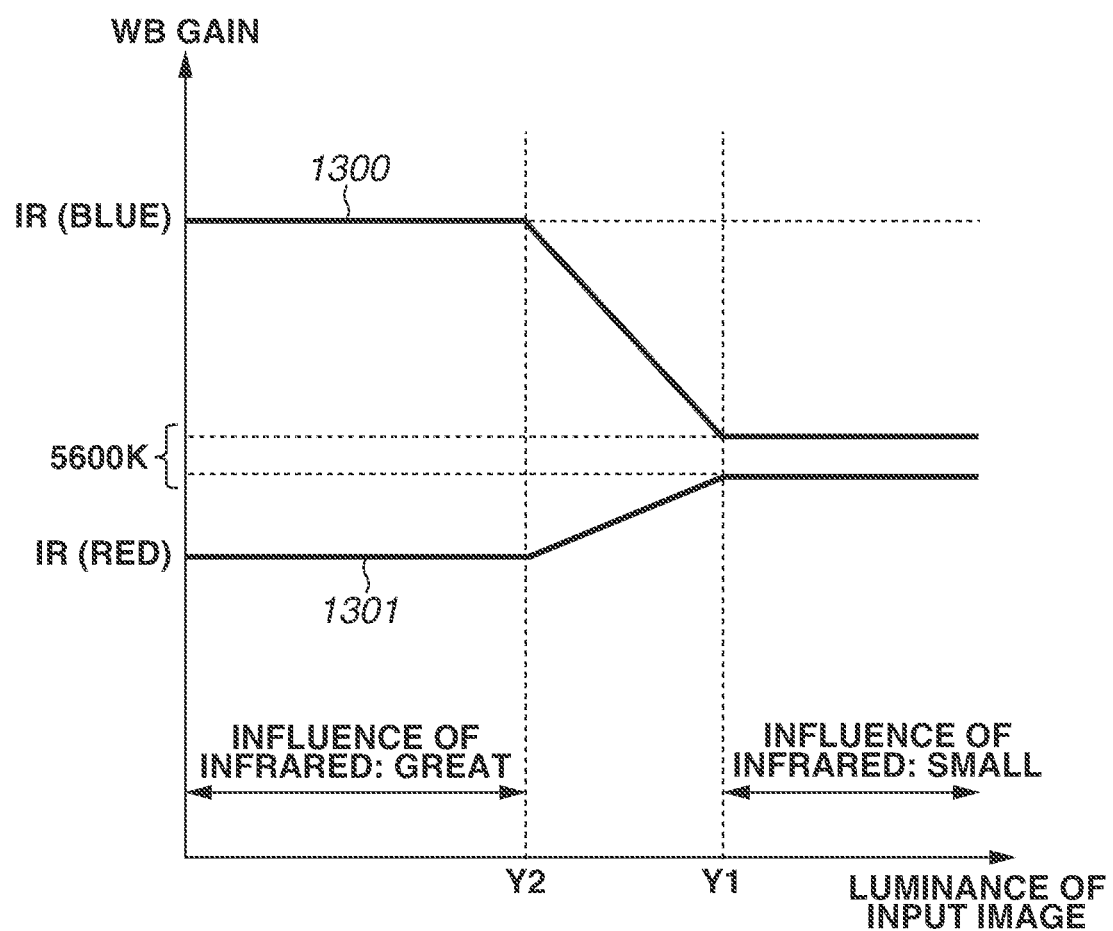
FIG. 13 is a diagram illustrating an example of a WB gain according to the fifth exemplary embodiment.

With reference to FIG. 13, a WB gain correction process that is performed by the gain multiplication unit 106 according to the present exemplary embodiment is described.

FIG. 13 is a diagram illustrating an example of a WB gain correction method that is performed on a pixel by pixel basis by the gain multiplication unit 106 and illustrating a Blue gain 1300 and a Red gain 1301.

In a case where brightness of a pixel in the input image is greater than or equal to a predetermined value, the gain multiplication unit 106 determines that this region is a region where visible light is dominant. Then, the gain multiplication unit 106 applies a WB gain suitable for visible light. In a case where, on the other hand, brightness of a pixel in the input image is less than a predetermined value, the gain multiplication unit 106 determines that this region is a region where infrared light is dominant. Then, the gain multiplication unit 106 applies a WB gain suitable for an image including infrared light. More specifically, in a case where the luminance value of a pixel in the input image is greater than or equal to a first luminance threshold (greater than or equal to Y1), the gain multiplication unit 106 determines that this region is a region where visible light is dominant. Then, the gain multiplication unit 106 applies a WB gain suitable for visible light. In a case where, on the other hand, the luminance value of a pixel in the input image is less than or equal to a second luminance threshold (less than or equal to Y2), the gain multiplication unit 106 determines that this region is a region where infrared light is dominant. Then, the gain multiplication unit 106 applies a WB gain suitable for an image including infrared light. As described above, for example, the WB gain suitable for visible light is a WB gain suitable for a white light source at 5600 kelvins (K). The WB gain suitable for the image including infrared light is the WB gain acquired from the gain determining unit 105. The first and second luminance thresholds can have the same predetermined value, but have different values in the present exemplary embodiment, and the first luminance threshold has a value greater than that of the second luminance threshold.

That is, in a case where the luminance value of a pixel in the input image is greater than or equal to the first luminance threshold Y1, the gain multiplication unit 106 determines that the WB gain calculated by the gain calculation unit 102 is not effective. Then, in this case, the gain multiplication unit 106 applies a predetermined WB gain, such as a WB gain suitable for a white light source at 5600 K, as the third white balance control value to the pixel having the luminance value of greater than or equal to the first luminance threshold Y1. In a case where, on the other hand, the luminance value of a pixel in the input image is less than or equal to the second luminance threshold Y2, the gain multiplication unit 106 determines that the WB gain calculated by the gain calculation unit 102 is effective. Then, the gain multiplication unit 106 uses the WB gain determined by the gain determining unit 105.

However, for example, if the WB gain is sharply changed in some regions, a feeling of discomfort may be given to a user in terms of image quality. Thus, in a region where the luminance value of a pixel in the input image is less than the first luminance threshold and higher than the second luminance threshold (between Y1 and Y2), the gain multiplication unit 106 calculates an intermediate WB gain between the WB gain suitable for visible light and the WB gain suitable for the image including infrared light. In this case, the gain multiplication unit 106 applies the intermediate WB gain to the pixel in the input image. In the case of the present exemplary embodiment, the intermediate WB gain is a WB gain obtained by gradually changing the WB gain over time between the first and second luminance thresholds.

Implementation of the present exemplary embodiment as described above allows, even in a case where the input image includes a region where visible light is dominant and a region where infrared light is dominant, the WB gain to be corrected on a pixel by pixel basis, whereby an output image in which the white balance is adjusted to be appropriate is able to be obtained. Thus, in a use case as described above, the color of the LED indicator is correctly reproduced, whereby overlooking of an alert issued by the apparatus is prevented.

Sixth Exemplary Embodiment

An image processing apparatus according to a sixth exemplary embodiment is described below. In the above described exemplary embodiments, in accordance with the presence or absence of the influence of infrared light, the determination condition for determination of whether the WB gain is effective is changed. In contrast, in the sixth exemplary embodiment, a white balance control value calculated at a timing of switching between presence and absence of the influence of infrared light is determined to be effective, regardless of the determination condition.

A functional configuration diagram of the image processing apparatus according to the present exemplary embodiment is approximately the same as that according to the first exemplary embodiment, and the redundant drawings are omitted. Descriptions of functional units similar to those in the first exemplary embodiment are omitted, and only functional units having functions different from the first exemplary embodiment are described below.

In the sixth exemplary embodiment, based on the result of the detection of the infrared light detection unit 103, the gain calculation unit 102 outputs a white balance control value (a WB gain) calculated using a method different from those according to the above exemplary embodiments. More specifically, at the timing of a change in the result of the detection acquired from the infrared light detection unit 103, the gain calculation unit 102 according to the sixth exemplary embodiment calculates the WB gain by using a method different from those used during periods other than the timing. The different method for calculating the WB gain is, for example, a method in which, based on estimation that the input image includes an object having an achromatic color, the WB gain is calculated such that an integral value or an average value of the colors of the input image is a numerical value indicating an achromatic color. In the following description, such a WB gain calculation method is referred to as a "white setting".

The infrared light detection unit 103 detects the influence of infrared light on the colors of the input image. In the case of the sixth exemplary embodiment, the detection result of the infrared light detection unit 103 is sent not only to the gain determination unit 104, but also to the gain calculation unit 102.

Based on the detection result acquired from the infrared light detection unit 103, the gain determination unit 104 determines whether a WB gain acquired from the gain calculation unit 102 is effective. Then, the gain determination unit 104 outputs the determination result to the gain determining unit 105. In the case of the sixth exemplary embodiment, based on the result of the detection of the infrared light detection unit 103 and based on different determination condition, the gain determination unit 104 performs determination of whether the WB gain is effective. That is, at the timing of the change in the result of the detection result acquired from the infrared light detection unit 103, the gain determination unit 104 according to the sixth exemplary embodiment determines that the WB gain acquired from the gain calculation unit 102 is effective.

The gain determining unit 105 acquires the WB gain from the gain calculation unit 102 and acquires, from the gain determination unit 104, the result of the determination of whether the WB gain is effective. Then, the gain determining unit 105 determines a final WB gain and outputs the final WB gain to the gain multiplication unit 106. In a case where the WB gain from the gain calculation unit 102 is a WB gain that has been calculated by a white setting process and determined to be effective by the gain determination unit 104 at the timing of the change in the result of the detection of the infrared light, the gain determining unit 105 according to the sixth exemplary embodiment fixes the WB gain. More specifically, until when the IRCF removed is inserted again and the detection result of the infrared light detection unit 103 changes, i.e., while the IRCF is removed, the gain determining unit 105 according to the sixth exemplary embodiment continues to output a constant WB gain.

Figure 14:
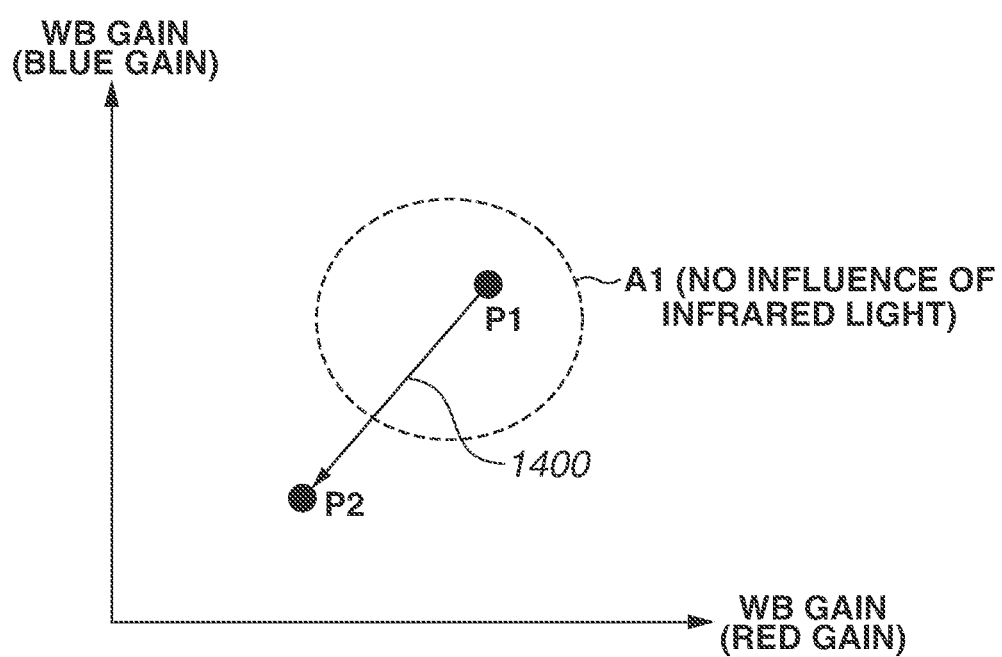
FIG. 14 is a diagram illustrating a WB gain control example according to a sixth exemplary embodiment.

FIG. 14 is a diagram illustrating the operation of the gain determining unit 105 according to the sixth exemplary embodiment.

In FIG. 14, a region A1 indicates the effective range of the WB gain of a case where the colors of the input image are not influenced by infrared light (an effective region A1). In a case where the colors of the input image are not influenced by infrared light, for example, a WB gain P1 within the effective region A1 is applied to the input image, and an output image is generated. On the other hand, in the sixth exemplary embodiment, a WB gain P2 in FIG. 14 indicates a WB gain calculated at the timing of a change in the presence or absence of the influence of infrared light on the colors of the input image. For example, the WB gain P2 is calculated by the above described white setting process. That is, in the sixth exemplary embodiment, the white setting process is performed at the timing of the change in the presence or absence of the influence of infrared light on the colors of the input image. In the sixth exemplary embodiment, the WB gain P2 calculated at the timing of the change in the presence or absence of the influence of the infrared light on the colors of the input image is determined to be effective. Then, the WB gain P2 is applied to the input image. That is, in the case of the sixth exemplary embodiment, at the timing of the IRCF being inserted and removed, the white setting process is performed, and a WB gain calculated by the white setting process is used. Thus, the white balance is able to be controlled according to the influence of infrared light on the colors of the input image, whereby the color reproducibility of an output image is improved.

In the present exemplary embodiment, the effectiveness of the WB gain calculated at the timing of the change in the presence or absence of the influence of infrared light on the colors of the input image is determined unconditionally or based on a condition milder than normal, and the WB gain is used. Thus, the WB gain calculation method is not limited to the method of the above described white setting process.

While, in a general white setting process, the WB gain after being set is fixed, the WB gain can be fixed or can be remained unfixed. In the present exemplary embodiment, after the WB gain P2 in FIG. 14 is set, the region A1 remains as the effective region of the WB gain. However, in a case where the colors of the input image are influenced by infrared light, a WB gain that is not included in the region A1 is calculated. That is, an ineffective WB gain is calculated, and in this case, the currently set white balance is maintained. Thus, the WB gain is naturally fixed to the WB gain P2.

Although an example has been described where the image processing apparatus according to each of the above-described exemplary embodiments is applied to the imaging apparatus, the image processing apparatus can be achieved by an information processing apparatus (a computer), such as a personal computer or a smartphone, connected to the imaging apparatus. In this case, the imaging apparatus outputs information indicating the presence or absence of the use of the IRCF, i.e., information indicating the presence or absence of the influence of infrared light on the colors of the input image, together with raw data captured by an imaging unit and imaging parameters indicating the exposure time, the frame rate, and the exposure value to the computer. Alternatively, the information indicating the presence or absence of the influence of the infrared light may be input by the user. Then, the computer performs image processing similar to that described in the above exemplary embodiments. The computer in this example executes a program code of software for achieving the image processing according to the present exemplary embodiment. Although the hardware configuration of the computer for achieving the image processing apparatus according to the present exemplary embodiment is not illustrated, the computer includes a central processing unit (CPU), a read-only memory (ROM), a random-access memory (RAM), an auxiliary storage device, a display unit, an operation unit, a communication interface (I/F), and a bus. The CPU controls the entire operation of the computer and executes the above white balance control using a computer program and data stored in the ROM or the RAM. Alternatively, the image processing apparatus according to the present exemplary embodiment may include one or more pieces of dedicated hardware different from the CPU, and the dedicated hardware may be configured to execute at least a part of the processing of the CPU. Examples of the dedicated hardware include an application-specific integrated circuit (ASIC), a field-programmable gate array (FPGA), and a digital signal processor (DSP). The ROM stores a program that does not need to be changed. The RAM temporarily stores a program and data supplied from the auxiliary storage device, and data supplied from outside via the communication I/F. The auxiliary storage device includes a hard disk drive (HDD) and stores various pieces of data, such as image data, imaging parameters, and information indicating the presence or absence of the influence of infrared light. The display unit is composed of, for example, a liquid crystal display or an LED display and displays a graphical user interface (GUI) for the user to operate the image processing apparatus. The operation unit includes, for example, a keyboard, a mouse, a joystick, and a touch panel. The operation unit receives user operations and inputs various instructions to the CPU. The CPU also operates as a display control unit that controls the display unit, and an operation control unit that controls the operation unit. The communication I/F is used for communication with an external apparatus of the image processing apparatus. For example, in a case where the image processing apparatus is further connected in a wired manner to the external apparatus, a communication cable is connected to the communication I/F. In a case where the image processing apparatus has the function of wirelessly communicating with the external apparatus, the communication I/F includes an antenna. The bus connects the components of the image processing apparatus and transmits information. In the case of the present exemplary embodiment, the external apparatus connected to the image processing apparatus is the above described imaging apparatus or another information processing apparatus. Although the display unit and the operation unit are disposed inside the image processing apparatus, at least one of the display unit and the operation unit can be disposed as another apparatus outside the image processing apparatus. The image processing apparatus is not necessarily include the display unit or the operation unit.

While desirable exemplary embodiments of the present invention have been described above, the present invention is not limited to these exemplary embodiments, and can be modified and changed in various ways within the scope of the present invention.

The present invention can also be achieved by the process of supplying a program for achieving one or more functions of the above exemplary embodiments to a system or an apparatus via a network or a storage medium, and causing one or more processors of a computer of the system or the apparatus to read and execute the program. Alternatively, the present invention can also be achieved by a circuit (e.g., an ASIC) for achieving the one or more functions.

All the above exemplary embodiments merely illustrate specific examples for carrying out the present invention, and the technical scope of the present invention should not be interpreted in a limited manner based on these exemplary embodiments. That is, the present invention can be carried out in various ways without departing from the technical idea or the main feature of the present invention.

The present invention is not limited to the above exemplary embodiments, and can be changed and modified in various ways without departing from the spirit and the scope of the present invention. Thus, the following claims are appended to publicize the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to perform control to obtain appropriate white balance even when an IRCF is removed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
at least one processor; and
a memory coupled to the at least one processor, the memory storing instructions that, when executed by the at least one processor, cause the at least one processor to:
detect an influence of infrared light on a color of an input image;
calculate a first white balance control value based on the input image;
perform determination of whether the first white balance control value is effective; and
set a predetermined white balance control value based on a result of the determination,
wherein, based on a result of the detection, a determination condition is determined, the determination condition being used for the determination of whether the first white balance control value is effective.

2. The image processing apparatus according to claim 1, wherein in a case where it is determined that the first white balance control value is effective, the first white balance control value is set.

3. The image processing apparatus according to claim 1, wherein the predetermined white balance control value is set based on the determination condition.

4. The image processing apparatus according to claim 1, wherein the influence of infrared light is detected in accordance with whether the input image is an image obtained from light passed through an infrared light cut-off filter.

5. The image processing apparatus according to claim 1, wherein the influence of infrared light is detected in accordance with illuminance of an environment where the input image has been captured.

6. The image processing apparatus according to claim 1, wherein magnitude of the influence of infrared light on the color of the input image is detected, and
wherein the determination condition is determined in accordance with the magnitude of the influence of infrared light.

7. The image processing apparatus according to claim 6, wherein the determination condition is determined such that with increase in the influence of infrared light, the determination condition is set to be more different from the determination condition of a case where the influence of infrared light is small.

8. The image processing apparatus according to claim 6, wherein the determination condition is determined such that with increase in sensitivity of an imaging sensor having captured the input image, the determination condition is set to be more different from the determination condition of a case where the influence of infrared light is small.

9. The image processing apparatus according to claim 1, wherein in a case where the first white balance control value is included in a predetermined effective range, it is determined that the first white balance control value is effective, and in a case where the first white balance control value is not included in the predetermined effective range, it is determined that the first white balance control value is not effective.

10. The image processing apparatus according to claim 9, wherein the determination condition is determined such that with increase in the influence of infrared light, the predetermined effective range is set to be smaller than a range of a case where the influence of infrared light is small.

11. The image processing apparatus according to claim 9, wherein in a case where it is determined that the first white balance control value is effective, a white balance control value is set, in which the white balance control value is different from the first white balance control value and included in the predetermined effective range.

12. The image processing apparatus according to claim 9, wherein in a case where it is determined that the first white balance control value is not effective, the setting unit sets a white balance control value included in the predetermined effective range.

13. The image processing apparatus according to claim 9, wherein at a timing of a change in the predetermined effective range from a first region to a second region, a white balance control value is set, in which the white balance control value is included in a common region between the first and second regions.

14. The image processing apparatus according to claim 9, wherein at a timing of a change in the result of the detection, it is determined that the first white balance control value that is not included in the predetermined effective range is effective.

15. The image processing apparatus according to claim 14, wherein from when has been determined that the first white balance control value not included in the predetermined effective range has been effective, at the timing of the change in the result of the detection, until when the result of the detection changes again, the first white balance control value is set, in which the first white balance control value has been calculated at the timing of the change in the result of the detection and is not included in the predetermined effective range.

16. The image processing apparatus according to claim 14, wherein at the timing of the change in the result of the detection, the first white balance control value is calculated based on a method different from a method used during a period when the result of the detection does not change.

17. The image processing apparatus according to claim 1, wherein the first white balance control value over time is changed gradually.

18. The image processing apparatus according to claim 1, wherein, based on the input image influenced by infrared light, the first white balance control value is calculated.

19. An image processing method that is executed by the image processing apparatus, the image processing method comprising:
   detecting an influence of infrared light on a color of an input image;
   calculating a first white balance control value, based on the input image;
   performing determination of whether the first white balance control value is effective; and
   setting a predetermined white balance control value, based on a result of the determination,
   wherein in the determination, based on a result of the detection, a determination condition is determined, the determination condition being used for the determination of whether the first white balance control value is effective is determined.

20. A non-transitory computer-readable storage medium storing a program for causing a computer to execute a method comprising:
   detecting an influence of infrared light on a color of an input image;
   calculating a first white balance control value, based on the input image;
   performing determination of whether the first white balance control value is effective; and
   setting a predetermined white balance control value, based on a result of the determination,
   wherein in the determination, based on a result of the detection, a determination condition is determined, the determination condition being used for the determination of whether the first white balance control value is effective is determined.

* * * * *